US011991498B2

(12) United States Patent
Goekay et al.

(10) Patent No.: US 11,991,498 B2
(45) Date of Patent: May 21, 2024

(54) METHOD FOR OPERATING A HEARING AID AND HEARING AID

(71) Applicant: Sivantos Pte. Ltd., Singapore (SG)

(72) Inventors: Umut Goekay, Mainz (DE); Frank Naumann, Bubenreuth (DE)

(73) Assignee: Sivantos Ptd. Ltd., Singapore (SG)

( * ) Notice: Subject to any disclaimer, the term of this patent is extended or adjusted under 35 U.S.C. 154(b) by 61 days.

(21) Appl. No.: 17/805,268

(22) Filed: Jun. 3, 2022

(65) Prior Publication Data

US 2022/0394395 A1 Dec. 8, 2022

(30) Foreign Application Priority Data

Jun. 3, 2021 (DE) ..................... 10 2021 205 663.6

(51) Int. Cl.
*H04R 25/00* (2006.01)

(52) U.S. Cl.
CPC .................................. *H04R 25/305* (2013.01)

(58) Field of Classification Search
CPC .................................................... H04R 25/305
See application file for complete search history.

(56) References Cited

U.S. PATENT DOCUMENTS 6,785,394 B1 8/2004 Olsen et al.
7,831,056 B2 11/2010 Nikles et al.
8,644,535 B2 2/2014 Steinbuss
2007/0008752 A1 1/2007 Senouci
2007/0147624 A1 6/2007 Fischer
2013/0208930 A1 8/2013 Nielsen et al.
2016/0322978 A1 11/2016 Stapleton et al.
2017/0279165 A1 * 9/2017 Tanii .................... G01R 31/392
2019/0196563 A1 6/2019 Lai

FOREIGN PATENT DOCUMENTS

DE 102005061002 A1 6/2007
DE 102008053457 B3 2/2010
DE 102012212172 A1 4/2013

(Continued)

OTHER PUBLICATIONS

Bentler Ruth et al: "Trainable Hearing Aids" Modern Hearing Aids: Verification, outcome measures, and follow-up, Mar. 30, 2014 (Mar. 30, 2014), Plural Publishing, San Diego, USA, XP055965867, ISSN: 1740-701X, ISBN: 978-1-59756-482-3, pp. 386-388.

(Continued)

*Primary Examiner* — Suhan Ni
(74) *Attorney, Agent, or Firm* — Laurence A. Greenberg; Werner H. Stemer; Ralph E. Locher

(57) ABSTRACT

A method is indicated for operating a hearing aid, wherein the hearing aid is switchable between a usage state, in which a signal processing unit of the hearing aid is activated, and an idle state, in which the signal processing unit is deactivated. The hearing aid has a time measuring unit, which has a first timer and a second timer. The first timer is activated in the usage state and is deactivated in the idle state, for time measurement during the usage state. The second timer is activated in the idle state for time measurement during the idle state. Furthermore, a corresponding hearing aid is indicated.

13 Claims, 1 Drawing Sheet

(56) References Cited

FOREIGN PATENT DOCUMENTS

| | | |
|---|---|---|
| EP | 1746861 A1 | 1/2007 |

OTHER PUBLICATIONS

Anonymous: "Application Note 3816—Selecting a Backup Source for Real-Time Clocks", Maxim—Design Support—Technical Documents Application Notes, Real-Time Clocks, May 26, 2006 (May 26, 2006), pp. 1-5, XP055966085 URL:pdfserv.maximintegrated.com/en/an/AN3816.pdf [retrieved Sep. 28, 2022].

Anonymous: "Application Note 3517—Estimating Super Capacitor Backup Time on Trickle-Charger Real-Time Clocks", Maxim Integrated—Design Support—Technical Documents—Application Notes, May 24, 2005 (May 24, 2005), pp. 1-4, XP055966079, URL:pdfserv.maximintegrated.com/en/an/AN3517.pdf [retrieved Sep. 28, 2022].

* cited by examiner

METHOD FOR OPERATING A HEARING AID AND HEARING AID

CROSS-REFERENCE TO RELATED APPLICATION

This application claims the priority, under 35 U.S.C. § 119, of German Patent Application DE 10 2021 205 663.6, filed Jun. 3, 2021; the prior application is herewith incorporated by reference in its entirety.

FIELD AND BACKGROUND OF THE INVENTION

The invention relates to a method for operating a hearing aid and a hearing aid.

A hearing aid generally has an input transducer, a signal processing unit, and an output transducer. A hearing aid is used, for example, to care for a hearing-impaired user and to compensate for hearing loss. The input transducer generates an input signal, for example, from sound signals from the surroundings. The input signal is applied to the signal processing unit, which modifies the input signal and thus generates an output signal. To compensate for hearing loss, the input signal is amplified, for example, according to an audiogram of the user using a frequency-dependent amplification factor. The output signal is finally output by means of the output transducer to the user, typically as a sound signal.

A hearing aid profits in greatly varying ways from the possibility of a time measurement. For example, a usage time of the hearing aid could be determined using a time measurement, for example, to monitor the regular use of the hearing aid by the user. The usage duration of individual settings could also be determined, for example, to recognize preferred settings of the user and deliberately improve them. It is also conceivable to recognize the point in time and the duration of various environmental situations on the basis of a time measurement, in order to thus, for example, identify repeating usage situations and then deliberately offer suitable settings for the hearing aid to the user at a given point in time. Beyond this, many further possible applications for a time measurement in the hearing aid are also conceivable.

It is described in published, European patent application EP 1 746 861 A1, corresponding to U.S. Pat. No. 7,831,056, that frequency-stable components such as quartzes can be used in hearing aids, which disadvantageously have a high power consumption and a large space requirement, however. Furthermore, a hearing aid is described which has a free-wheeling oscillator, which can be retuned via the supply current or switchable capacitors and which supplies a master clock for signal processing. To retune the oscillator, an external transmitter sends special signals to the hearing aid. In the hearing aid, this is used to dispense with a frequency-stable component, for example a quartz.

SUMMARY OF THE INVENTION

Against this background, it is an object of the invention to improve the time measurement in a hearing aid. For this purpose, a corresponding method for operating a hearing aid and such a hearing aid are to be specified.

The object is achieved according to the invention by a method having the features according to the independent method claim and by a hearing aid having the features according to the independent hearing aid claim. Advantageous embodiments, refinements, and variants are the subject matter of the dependent claims. The statements on the method also apply correspondingly to the hearing aid and vice versa. When method steps are explicitly or implicitly described hereinafter, advantageous embodiments result for the hearing aid in that it has a control unit which is designed to carry out one or more of these method steps.

One core concept of the invention is in particular the use of two different timers in a hearing aid to enable a continuous time measurement independently of an external timer, especially also when the hearing aid is switched off.

The method is used for operating a hearing aid. The hearing aid is switchable between a usage state, in which a signal processing unit of the hearing aid is activated, in particular for intended use, i.e., the hearing aid is switched on, and an idle state, in which the signal processing unit is deactivated, i.e., the hearing aid is switched off. The usage state is used in particular to operate the hearing aid when it is used by a user. The idle state, in contrast, is used in particular to operate the hearing aid when it is not presently being used by the user.

The hearing aid has a time measuring unit, which has a first timer and a second timer. The two timers are each in particular configured as an oscillator and accordingly each generate a cyclic or periodic signal and thus oscillations, by the counting of which a time measurement is carried out. The first timer is activated in the usage state and deactivated in the idle state, for time measurement during the usage state. A usage time is preferably measured using the first timer, for example, a duration of the usage state or a duration of a usage event or a usage situation. Accordingly, a time measurement takes place in the usage state but not in the idle state using the first timer. In a suitable embodiment, the first timer is activated at the beginning of the usage state and deactivated again at its end. In contrast, the second timer is activated in the idle state for time measurement during the idle state. The second timer is suitably deactivated in the usage state. A duration of the idle state is preferably measured using the second timer. In a suitable embodiment, the second timer is activated at the beginning of the idle state and deactivated again at its end. Overall, a time measurement is thus possible both in the usage state and also in the idle state using the two timers, namely in each case by means of a corresponding timer. The two time measurements are advantageously combined to form a continuous time measurement.

The hearing aid generally has an input transducer, a signal processing unit, and an output transducer. The input transducer is typically a microphone. The output transducer is typically a receiver, which is also referred to as a loudspeaker. A hearing aid is generally associated with a single user and is only used by this user. A hearing aid is preferably used to care for a hearing-impaired user and to compensate for hearing loss. The input transducer generates an input signal which is supplied to the signal processing unit. The signal processing unit modifies the input signal and thus generates an output signal, which is thus a modified input signal. To compensate for a hearing loss, the input signal is amplified, for example, according to an audiogram of the user using a frequency-dependent amplification factor. The output signal is finally output by means of the output transducer to the user. In a hearing aid having microphone and receiver, the microphone accordingly generates the input signal from sound signals in the surroundings and the receiver in turn generates a sound signal from the output signal. The input signal and the output signal are electrical signals which are therefore each also referred to in short as a signal. The sound signals of the surroundings and the sound signal possibly output by the receiver, in contrast, are acoustic signals.

In the usage state, the hearing aid is activated and then carries out processing and output of signals as described above. In other words: the usage state is activated upon switching on the hearing aid, the usage state is deactivated upon switching off the hearing aid. With activated usage state, i.e., with switched-on hearing aid, sound signals from the surroundings are converted using the input transducer into an input signal. Alternatively or additionally, an electrical input signal is received directly by the hearing aid by means of a suitable input transducer, for example, from another device which transmits the electrical input signal via a data connection to the hearing aid, and used as the input signal. In the signal processing unit, the input signal is then processed and an output signal is generated therefrom. This is then output via the output transducer to the user. The usage state is thus an operating state of the hearing aid for its intended use by the user, by which the hearing aid is then in particular also worn during the usage state. The time period between a beginning and a subsequent end of the usage state is also referred to as a usage phase.

In the idle state, in contrast, the hearing aid is switched off, the signal processing unit is deactivated, and the described processing and output of signals is not carried out. In particular, the signal processing unit and also the input transducer and the output transducer are deactivated here and do not consume energy in this way. The hearing aid is thus essentially deactivated, but not completely deactivated here, rather the hearing aid has one or more idle state functions which—if necessary—are executed in the idle state and accordingly consume energy. The essential functionality for the processing and output is deactivated, however. The time measurement using the second timer is such an idle state function and the second timer is accordingly activated in the idle state. The energy consumption is drastically reduced in the idle state in relation to the usage state, however, above all in that no processing and output of signals takes place. The idle state is thus an operating state in which the hearing aid is in particular not used by the user and in particular is also not worn by the user. For example, the hearing aid is stored in a storage box or connected to a charger in the idle state. The time period between a beginning and a subsequent end of the idle state is also referred to as the idle phase.

The usage state and the idle state mutually exclude one another, at a given point in time only one of the two states can always be activated. The usage state and the idle state mutually alternate, so that a time sequence of usage phases in which the usage state is activated and idle phases in which the idle state is activated results.

The invention is primarily based on the observation that a time measurement in a hearing aid can in principle take place in relation to a specific event, for example, switching on the hearing aid, i.e., the beginning of the usage state, marks a point in time t=0, from which counting is then performed in suitable time units. Upon each new beginning of the usage state, i.e., in each new usage phase, it begins again at the point in time t=0. Usage points in time, usage events, and usage situations are then determinable relative to the beginning of the usage state, however, these cannot be related to usage points in time, usage events, and usage situations of another usage phase, because a continuous time measurement is not possible.

An absolute time measurement accordingly provides further advantages, in which multiple chronologically separate usage phases of the hearing aid can be linked to one another. The actual time of day and possibly also the present date are expediently known to the hearing aid, especially to recognize repeating usage patterns in the course of the day and to control the hearing aid depending on the time of day. While a relative time measurement only enables the measurement of a duration (i.e., time duration), additional, specific items of time information are available using an absolute time measurement, for example, specific points in time and also from multiple different usage phases.

In the present case it was observed that in hearing aids generally only a relative time measurement takes place. This is historically based since often a zinc-air battery was used for the energy supply of hearing aids and sometimes still is, which is galvanically separated from all electronic components of the hearing aid upon switching off of the hearing aid, so that a timer, which is an electronic component, is also not supplied with energy. In the idle state, a time measurement is thus not possible and the relative time measurement in the usage state remains as the only option. In more recent hearing aids, which use a lithium-ion battery or the like, however, this restriction typically does not apply and an energy supply is also possible in the idle state. The energy consumption is expediently reduced as much as possible in the idle state, however, to enable the longest possible duration of the usage state.

One essential advantage of the invention results from the use of two timers and in particular is that a time measurement is possible both in the usage state and in the idle state, thus both during usage phases and also during idle phases. An absolute and continuous time measurement, which is not interrupted by repeated switching on and off of the hearing aid, is thus also possible overall independently of the operating state of the hearing aid. A real time synchronization is not primarily required, but is advantageous. Independently thereof, a continuous time measurement is now advantageously carried out using the time measuring unit, by means of which usage points in time, usage events, and usage situations of various usage phases (and possibly also idle phases) can then also be linked with one another and advantageously are also linked. In this way, a shared, continuous time frame is provided over multiple usage and idle phases, which is also referred to as hearing aid time. This hearing aid time is so to speak an internal time of the hearing aid. However, this internal time is not to be confused with the above-described relative time measurement. Rather, the hearing aid time is solely relative insofar as it does not necessarily correspond to the real time, i.e., the actually presently existing time, but rather is measured relative to a starting point. In contrast to the relative time measurement, however, the hearing aid time in particular only has one single point in time t=0 as a starting point and in particular is not begun again for each individual usage phase or, if multiple points in time t=0 are used, at least the relative location thereof in relation to one another is known. This is because one advantage of the two timers is in particular that update of the hearing aid time beyond a single usage phase is possible and thus an absolute time measurement is also possible. This then enables a data analysis using the hearing aid, which is improved in relation to a data analysis only oriented to a relative time measurement. The details of this data analysis are not presently relevant, however; it is primarily only important that the hearing aid has an absolute time measurement and is not dependent for this purpose on an additional, external device.

In one preferred embodiment, for the continuous time measurement, the time measuring unit then also updates the hearing aid time in the usage state, i.e., during a usage phase, using the first timer and in the idle state, i.e., during an idle phase, using the second timer. The two timers thus together form a common hearing aid clock, which specifies the continuously measured hearing aid time, for example, as a combination of date and time. Upon switching on and off, the timer which is used to update the hearing aid time is accordingly changed. This has the advantage that depending on the operating state, a timer respectively optimally adapted to this operating state is usable.

The time measuring unit is suitably calibrated by means of a real time, which is provided by a secondary device, which is connected to the hearing aid for data exchange. As already described, the real time is in particular the actually presently existing time. Due to the described synchronization of the hearing aid with the secondary device, the hearing aid time then corresponds to the real time so that not only an absolute time measurement takes place, but also a time measurement in the time frame of the real time. The time measuring unit then insofar represents a real time clock of the hearing aid. However, it is to be emphasized that such a calibration of the hearing aid time using a real time for a continuous time measurement is not required as such, because a lack of calibration ultimately only results in an offset between hearing aid time and real time, which is not necessarily relevant for an improved data analysis.

The secondary device is, for example, a computer, for example, operated at an audiologist and using fitting software, a smartphone, or the like and is connectable in a wireless or wired manner to the hearing aid for data exchange, for example, via Bluetooth or WLAN. The secondary device has a real time clock which specifies the real time (also referred to as system time, for example, UTC, i.e., coordinated universal time), which is then transmitted to the hearing aid to calibrate the hearing aid time and thus to calibrate the time measuring unit. The hearing aid time is expediently calibrated each time the hearing aid is connected to a suitable secondary device.

In the delivery state, the hearing aid time is generally uncalibrated, so that upon the first startup of the hearing aid, i.e., upon the initial switching on and thus at the beginning of the first usage phase, a point in time has to be arbitrarily specified or estimated as the starting point. For example, during the production of the hearing aid, the day of the production or a date lying several days or weeks in the future is selected as the starting point. The time of day at the starting point is, for example, 00:00 AM. Depending on the actual time upon startup, an offset then results. The hearing aid is advantageously capable in principle due to the time measuring unit of carrying out a time measurement over a full day, i.e., over 24 hours, for example, in that a counter is simply incremented at regular time intervals until 24 hours are reached, directly following this a new day is then counted. Whether these days correspond to actual days is primarily unimportant, the hearing aid is at least capable of monitoring usage points in time, usage events, and usage situations, especially switching on and off of the hearing aid, in the course of the day and determining an absolute and continuous time frame for the usage state in this aspect. Up to the initial calibration using a secondary device, an absolute time measurement then takes place, however, this is regularly shifted by an offset (thus a fixed value) with respect to the real time. This is then corrected accordingly upon a later calibration and the previous time measurement is suitably converted. The original starting point is then accordingly provided with the correct real time. For example, if 00:00 AM was used as the starting point, but the hearing aid was actually switched on for the first time at 7:15 AM, a time difference of 7 hours 15 minutes exists until the first calibration, which is then corrected (an offset in the date is similarly corrected if necessary). The data analysis up to this point is then corrected accordingly.

As already indicated, it is now possible to optimize the two timers to the respective operating state. In one preferred embodiment, for this purpose the first timer has a greater accuracy than the second timer and the second timer has—when activated—a lower energy consumption than the first timer—when activated. “Accuracy” is understood in particular as “chronological accuracy” or “frequency stability”, i.e., how accurately the timer measures the time and how frequency stable the timer is. The higher the accuracy, the more uniformly the timer measures successive time units and/or the lower the deviation (“drift”) from the real time accumulated with time. The first timer is therefore also referred to as a precision timer, the second timer is referred to as a low-energy timer. This design is based on the consideration that, on the one hand, the most accurate possible time measurement is desirable, which is now implemented using the first timer and, on the other hand, as little energy as possible is to be consumed in the idle state, which is now implemented using the second timer. The absolute accuracy and absolute energy consumption of the two timers are not primarily important, energy consumption and accuracy of the two timers relative to one another are more important, and that the conflict of goals between accuracy and energy consumption is thus resolved differently in the various operating states. The first timer is selected with respect to the accuracy and the second timer with respect to the energy consumption. Accordingly, the possible occurrence of a deviation of the hearing aid time from the real time in the idle state is tolerated and is also unproblematic insofar as this can be recognized accordingly upon a calibration using a secondary device or upon a calibration of the second timer using the first timer and—if necessary—corrected again.

In one suitable design, the first timer, i.e., the precision timer, is a quartz oscillator. A quartz oscillator uses an oscillating quartz for clock generation and thus for time measurement and thus has a high accuracy. The accuracy is defined in particular by the deviation of the actual frequency of an oscillator from a nominal frequency thereof or equivalently the deviation of the actually passed time in relation to the time measured by the oscillator, in particular their quotient. The deviation is typically specified in millionths, i.e., ppm. In a quartz oscillator, the deviation is typically better than 100 ppm. In other words: a quartz oscillator is particularly frequency stable, thus has a particularly constant clock frequency, and thus generates oscillations which differ particularly little from one another. The oscillating quartz itself does not consume energy as such, however, the oscillator has a circuit for its activation, which typically has an energy consumption of 10 μW to 100 μW; however, the energy consumption can also deviate from these values. The quartz oscillator is preferably a quartz oscillator which is also used as a clock generator for operating the signal processing unit. Since the first timer is only used when the signal processing unit is also activated, it is advantageous to use a clock generator as the first timer which is also used as the clock generator for other functions in the usage state, for example, for the signal processing unit.

In one suitable design, the second timer, i.e., the low-energy timer, is an RC oscillator or LC oscillator. The RC oscillator and the LC oscillator are each also referred to as a resonant circuit. One example of an RC oscillator is a phase shifter oscillator. Examples of an LC oscillator are an LC parallel resonant circuit or an LC series resonant circuit. The second timer is preferably a freewheeling oscillator, i.e., in contrast to a quartz oscillator especially is not particularly frequency stable, so that the second timer has a clock frequency possibly varying over time. Accordingly, a deviation results for the clock frequency which is quantified, for example, by a statistical measure such as the variance or the like.

An RC oscillator has one or more resistors and capacitors for the clock generation, which are interconnected with one another suitably, in order to generate an oscillation and thus enable a time measurement. An LC oscillator similarly has one or multiple inductors and capacitors for the clock generation to generate an oscillation for the time measurement. In each case, the second timer thus has at least one capacitor which is repeatedly charged and discharged to generate the oscillations. The capacitor then in particular also determines with which energy the second timer is charged at the beginning of the idle state. The accuracy of an RC or LC oscillator is generally at least one order of magnitude worse than the accuracy of a quartz oscillator. For example, the deviation is 10,000 ppm (i.e., 3 orders of magnitude more than indicated above for the quartz oscillator), which corresponds to a deviation from a nominal frequency of the RC oscillator of 1%. In contrast, the energy consumption is generally at least one order of magnitude less than in the case of a quartz oscillator and is generally dependent on the nominal frequency and the required circuit.

The second timer is suitably integrated in an analog IC (i.e., an analog integrated circuit) of the hearing aid. The analog IC is preferably formed separately from the signal processing unit. The signal processing unit is suitably implemented as part of a digital signal processor (abbreviated: DSP). Both the analog IC and also the signal processor and therefore also the signal processing unit are parts of a control unit of the hearing aid. The analog IC is embodied, for example, as a microcontroller, ASIC, or the like; a design is also suitable in which the entire control unit is designed as a microcontroller, ASIC, or the like, wherein then the analog IC forms a section of the control unit. In addition to the second timer, one or more other electronic components having corresponding functions are expediently also integrated in the analog IC, as also explained hereinafter. In principle, designs are also possible in which further analog functions not further relevant here are integrated in the analog IC.

The hearing aid preferably has a shift register, which is activated by the second timer in such a way that the duration of the idle state, i.e., in particular the duration of a single idle phase, is stored in the shift register (also referred to as a time register). In a suitable design for this purpose, the shift register is integrated in the analog IC and connected to the second timer. A time measurement of the second timer is stored in the shift register, for example, in that the shift register is simply used as a counter which is progressively increased by the second timer if the second timer is activated.

The analog IC preferably has a main memory. The main memory is expediently connected to the above-mentioned shift register to store a time measurement of the second timer in the main memory and then carry out a new time measurement using the shift register, without discarding the prior time measurement. In this way, the durations of various idle phases are measured and stored separately in the main memory, in particular for the continuous time measurement or, for example, for a data analysis. In a particularly simple design, as soon as the idle state is deactivated and the usage state is activated, the shift register is read out and the time measurement stored therein, i.e., the duration of the idle phase just ended, is stored in the main memory, in order to be combined, in particular added, there with a time measurement of the first timer from the preceding or the now following usage phase and in this way to update the hearing aid time. Accordingly, the first timer is expediently also connected to the main memory in order to store a time measurement of the first timer therein, for example, a duration of a usage phase.

In a suitable design, the first timer is also at least partially integrated in the analog IC, in particular in the case of a quartz oscillator, the associated oscillating quartz is in principle not integrated in the analog IC, but rather formed as a separate component and suitably connected to the analog IC.

In a particularly simple design, the second timer is formed untrimmed, i.e., uncalibrated. Especially in the case of an RC or LC oscillator, production-related inaccuracies result which are regularly remedied in that the RC or LC oscillator is trimmed. One or more additional capacitors are added here to achieve a desired oscillation behavior, in particular a specific clock frequency. Such trimming is expediently dispensed with in the present case, so that the production is simpler and more cost-effective overall. Instead, the second timer is calibrated using the first timer in the present case, i.e., a calibration of the second timer is carried out using the first timer. Since the first timer is in particular more accurate than the second timer, the latter may accordingly be calibrated using the former, so that separate trimming can be dispensed with during the production. For example, the hearing aid has a zero-crossing detector or flank detector for the calibration and a shift register as a counter and the second timer is calibrated in that its oscillations (also referred to as cycles) within a fixed time period and also the oscillations of the first timer in the same time period are counted using the shift register and then compared to one another. In this way, a parameter is determined, using which a time measurement of the second timer is converted. A suitable parameter is, for example, the ratio of number of cycles of the two timers per unit of time or the number of cycles of the second timer per single cycle of the first timer or the like. The parameter is expediently stored in the main memory. The calibration and in particular the determination of the parameter take place, for example, solely upon a first startup of the hearing aid or alternatively or additionally repeatedly whenever the usage state is activated. In particular in the latter case, a temperature instability of the second timer is preferably also taken into consideration automatically with the calibration.

In a suitable design, the second timer is not temperature stabilized and is thus advantageously particularly cost-effective. Efforts are typically made to make a timer as temperature stable as possible, in order to avoid temperature-related deviations during the time measurement. However, this is presently dispensed with in favor of the simplest possible design. Instead, the hearing aid expediently has a temperature sensor which is already provided, for example, in any case for one or more other functions of the hearing aid. A temperature is then measured using the temperature sensor, using which the second timer is calibrated, i.e., a calibration is carried out (additionally or alternatively to the above-described calibration using the first timer). In a suitable design, a linear relationship is assumed between temperature and deviation during the time measurement; alternatively or additionally, a calibration curve, function, or table is used, which is in particular stored in the main memory and was determined, for example, by experiments. The temperature is either measured directly during the idle state or at the beginning and/or end of an idle phase, thus upon activation or deactivation of the idle state. The latter has the advantage that less energy is consumed in the idle state, while the former supplies a higher accuracy for the calibration. The actual calibration then takes place, for example, in the usage state, to update the hearing aid time as accurately as possible after the end of the idle phase.

The hearing aid suitably has an energy management unit, for controlling the energy supply of the diverse components of the hearing aid and especially the analog IC and possibly further parts of the control unit by means of the battery. The energy supply thus takes place from a battery of the hearing aid. The battery is preferably a lithium-ion battery, also referred to as a lithium-ion secondary cell. The energy management unit is preferably integrated in the analog IC. The energy management unit is also referred to as a PMIC, i.e., "power management integrated circuit". The hearing aid expediently moreover has a safety switch to prevent a deep discharge of the battery in that it is galvanically separated from the remaining hearing aid below a minimum charge level. The safety switch is also preferably integrated in the analog IC. In one expedient design, the safety switch is a one-time switch which is formed open during the production of the hearing aid and is opened during the delivery to the user and is only closed once and permanently upon the first startup of the hearing aid. In this way, a deep discharge of the battery before the startup is avoided. However, a design is particularly advantageous in which the safety switch is a reversible switch, so that a deep discharge of the battery is also still avoided after the first startup, for example, if the duration of a single idle phase is sufficiently long that the charge level of the battery sinks below the minimum charge level. The safety switch is then again formed open during the production of the hearing aid and is opened during the delivery to the user and is only closed upon the first startup of the hearing aid, but reversibly, i.e., the safety switch is opened again, in particular by the energy management unit, when the charge level of the battery sinks below the minimum charge level. Otherwise the safety switch also remains closed in the activated idle state, however, so that then the second timer is supplied with energy.

The energy management unit preferably also controls a supply of the second timer with energy from the battery. In a suitable design, the second timer is charged once with energy from a battery of the hearing aid upon activation and then not supplied further with energy from the battery thereafter, as long as the idle state is activated. Alternatively, the second timer is repeatedly charged from the battery of the hearing aid in the idle state. Especially in the case of an RC or LC oscillator, the second timer has one or more capacitors in principle, which are charged for the time measurement and then do not require further energy for a certain time. However, the charged energy is consumed with time, so that renewed charging can be necessary if this lasts longer than the idle state is activated, however, a single charge at the beginning of an idle phase is advantageously sufficient. If the second timer is repeatedly charged during the idle state, this expediently takes place whenever the second timer falls below a minimum charge level.

A design is also suitable in which the duration of the idle state is only measured up to a maximum duration and the second timer is only charged in the idle state when the maximum duration is not yet reached. In this way, a deep discharge of the battery is prevented in that the time measurement using the second timer is only carried out until reaching the maximum duration, for example, 7 days, and then the second timer is also deactivated, so that energy is no longer consumed. The above-described safety switch is then expediently also opened.

A deep discharge of the battery is alternatively or additionally avoided in that in one advantageous design, the second timer is only supplied with energy from the battery in the idle state when a charge level of the battery at least corresponds to a minimum charge level. The charge level is determined, for example, on the basis of the voltage of the battery or this is used directly as a measure of the charge level.

A hearing aid according to the invention has a control unit, in particular as described above. The control unit is moreover designed to carry out a method as described above.

Other features which are considered as characteristic for the invention are set forth in the appended claims.

Although the invention is illustrated and described herein as embodied in a method for operating a hearing aid and hearing aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
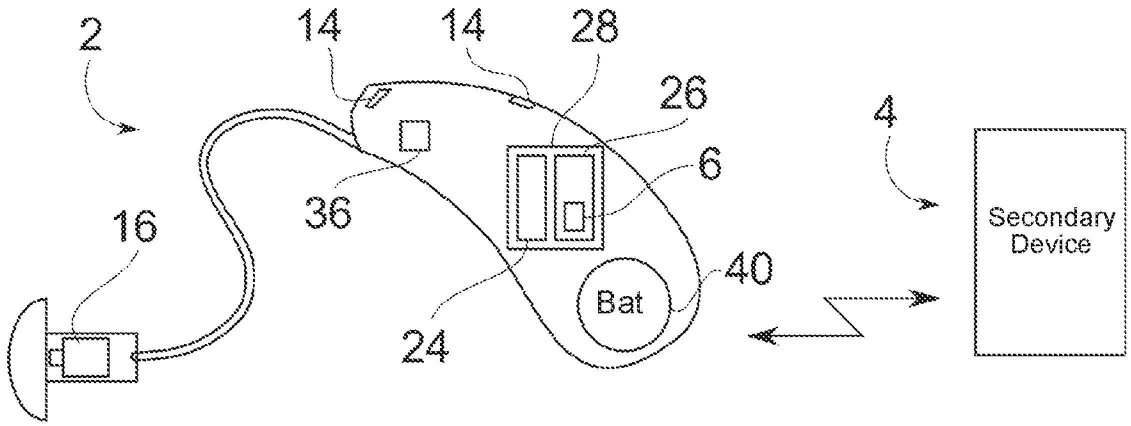
FIG. 1 is an illustration of a hearing aid.

A method for operating a hearing aid 2 is described hereinafter on the basis of FIGS. 1 to 3, which is shown in FIG. 1 together with a secondary device 4 and in detail in FIG. 2 as a pseudo-circuit diagram. The hearing aid 2 shown here is solely by way of example a so-called RIC device, the following statements also apply similarly to all other hearing aid types, however. The hearing aid 2 is switchable between a usage state, in which a signal processing unit 6 of the hearing aid 2 is activated for the intended use, i.e., the hearing aid 2 is switched on, and an idle state, in which the signal processing unit 6 is deactivated, i.e., the hearing aid 2 is switched off. The usage state is used to operate the hearing aid 2 when it is used by a user (not explicitly shown). In contrast, the idle state is used to operate the hearing aid 2 when it is presently not being used by the user.

The hearing aid 2 has a time measuring unit 8, which has a first timer 10 and a second timer 12. The two timers 10, 12 are each designed as an oscillator and accordingly each generate a cyclic or periodic signal and thus oscillations, by the counting of which a time measurement is carried out. The first timer 10 is activated in the usage state and deactivated in the idle state, for time measurement during the usage state, but not in the idle state. For example, the first timer 10 is activated at the beginning of the usage state and deactivated again at its end. In contrast, the second timer 12 is activated in the idle state, for time measurement during the idle state. The second timer 12 is presently deactivated in the usage state. For example, the second timer 12 is activated at the beginning of the idle state and deactivated again at its end. Overall, a time measurement both in the usage state and also in the idle state is thus possible using the two timers 10, 12, for example, a measurement of the duration of the respective state, namely by means of a corresponding timer 10, 12 in each case. In the present case, the two time measurements are combined to form a continuous time measurement.

The hearing aid 2 has, for example, as recognizable in FIG. 1, one or more input transducers 14 (two microphones here), a signal processing unit 6, and an output transducer 16 (a receiver here). The hearing aid 2 shown by way of example here is used to care for a hearing-impaired user and to compensate for hearing loss. The input transducer 14 generates an input signal which is supplied to the signal processing unit 6. The signal processing unit 6 modifies the input signal and thus generates an output signal, which is thus a modified input signal. The output signal is finally output by means of the output transducer 16 to the user.

In the usage state, the hearing aid 2 is activated and then carries out a processing and output of signals as described above. In other words: upon switching on of the hearing aid 2, the usage state is activated, upon switching off of the hearing aid 2, the usage state is deactivated. The time period between a beginning and a following end of the usage state is also referred to as the usage phase pn. During activated usage state, thus during a usage phase pn, sound signals from the surroundings are converted using the input transducer 14 into an input signal. Alternatively or additionally, an electrical input signal is received directly by the hearing aid 2 by means of another input transducer, for example, from another device, for example, the secondary device 4, which transmits the electrical input signal via a data connection to the hearing aid 2. In the signal processing unit 6, the input signal, however it is obtained, is then processed and an output signal is generated therefrom and this is then output via the output transducer 16 to the user.

In the idle state, in contrast, the hearing aid 2 is switched off, the signal processing unit 6 is deactivated, and the described processing and output of signals is not carried out. The time period between a beginning and a subsequent end of the idle state is also referred to as an idle phase pr. In the present case, the signal processing unit 6 and the input transducer 14 and the output transducer 16 are deactivated during an idle phase pr and in this way do not consume energy. The hearing aid 2 is thus essentially deactivated, but not completely deactivated, rather the hearing aid 2 has one or more idle state functions which—if required—are executed in the idle state and accordingly consume energy. However, the essential functionality for the processing and output is deactivated. The time measurement using the second timer 12 is such an idle state function and the second timer 12 is accordingly activated in the idle state. The energy consumption is drastically reduced in the idle state in comparison to the usage state, however, above all in that processing and output of signals do not take place. The idle state is thus an operating state in which the hearing aid 2 is not used by the user and is also not worn by the user.

The usage state and the idle state mutually exclude one another, at a given point in time only one of the two states can always be activated. The usage state and the idle state mutually alternate, so that a chronological sequence of usage phases pn, in which the usage state is activated, and idle phases pr, in which the idle state is activated, results.

Due to the use of two timers 10, 12, in the present case a time measurement is possible both in the usage state and in the idle state. An absolute and continuous time measurement is thus also possible overall independently of the operating state of the hearing aid 2, which is not interrupted by repeatedly turning the hearing aid 2 on and off. A real-time synchronization is not primarily required, but is optionally carried out. Independently thereof, a continuous time measurement is carried out using the time measuring unit 8, by means of which usage points in time, usage events, and usage situations of various usage phases pn (and possibly also idle phases pr) can then also be linked with one another and are also linked. In this way, a common continuous time frame is provided over multiple usage and idle phases pr, which is also referred to as hearing aid time th. This hearing aid time th is so to speak an internal time of the hearing aid 2 and is relative insofar as it does not necessarily correspond to the real time te, i.e., the actually presently existing time, but rather is measured relative to a starting point. An update of the hearing aid time th beyond a single usage phase pn is now possible using the two timers 10, 12. This then enables a data analysis using the hearing aid 2, which is improved in relation to a data analysis oriented only to a relative time measurement. However, the details of this data analysis are not relevant in the present case, it is primarily important solely that the hearing aid 2 has an absolute time measurement and is not dependent for this purpose on an additional external device. The hearing aid 2 accordingly does not require the secondary device 4 for the absolute time measurement.

In the present case, for the continuous time measurement, the time measuring unit 8 updates the hearing aid time th in the usage state using the first timer 10 and in the idle state using the second timer 12. This is illustrated in FIG. 3, which shows the hearing aid time th beginning from a starting point S (the starting point S is, for example, temporarily t=0 until an optional calibration using the real time te has taken place). Alternating usage and idle phases pn, pr are also indicated. During a usage phase pn, the first timer 10 is then activated and during an idle phase pr, the second timer 12 is then activated. The two timers 10, 12 thus together form a common hearing aid clock, which specifies the continuously measured hearing aid time th, for example, as a combination of date and time. Upon switching on and off, the timer 10, 12 which is used to update the hearing aid time th is accordingly changed.

Figure 3:
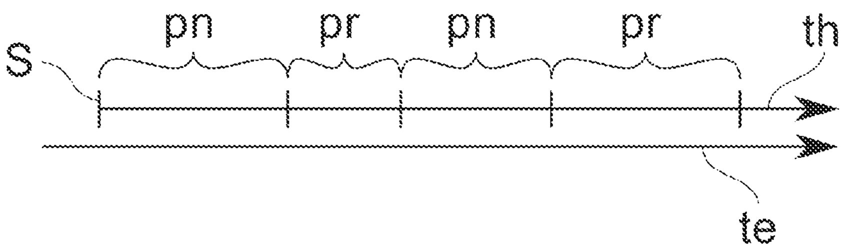
FIG. 3 is a chart showing a hearing aid time and a real time.

In addition, in the present case the time measuring unit 8 is calibrated by means of a real time te, which is also shown in FIG. 3 and which is provided here by a secondary device 4. The secondary device 4 is connected for this purpose to the hearing aid 2 for data exchange. Due to this synchronization of the hearing aid 2 with the secondary device 4, the hearing aid time th then corresponds to the real time te, so that not only an absolute time measurement takes place, but also a time measurement in the time frame of the real time te. The time measuring unit 8 then insofar represents a real time clock of the hearing aid 2. However, it is to be emphasized that such a calibration of the hearing aid time th using a real time te is not required for a continuous time measurement as such, because a lack of calibration ultimately only results in an offset between hearing aid time th and real time te, which is not necessarily relevant for the data analysis, however.

The secondary device 4 is, for example, a computer, for example, at an audiologist and operated using fitting software, a smartphone, or the like and is connectable in a wireless or wired manner to the hearing aid 2 for data exchange, for example, via Bluetooth or WLAN. The secondary device 4 has a real-time clock (not explicitly shown), which specifies the real time te (also referred to as system time, for example, UTC, i.e., coordinated universal time), which is then transmitted to the hearing aid 2 for calibrating the hearing aid time th and thus for calibrating the time measuring unit 8. For example, the hearing aid time th is calibrated each time the hearing aid 2 is connected to a suitable secondary device 4.

In the delivery state, the hearing aid time th is generally uncalibrated, so that upon the first startup of the hearing aid 2, i.e., upon the first switching on and thus upon beginning the first usage phase pn, a point in time has to be arbitrarily specified or estimated as the starting point. For example, during the production of the hearing aid 2, the day of the production or a date lying several days or weeks in the future is selected as the starting point S. The time of day at the starting point S is, for example, 00:00 AM. Depending on the actual time upon startup, an offset then results. The hearing aid 2 is already capable in principle due to the time measuring unit 8 of carrying out a time measurement over a full day, i.e., over 24 hours, for example, in that a counter is simply incremented at regular time intervals until 24 hours are reached; directly thereafter, a new day is then counted. It is primarily unimportant whether these days correspond to actual days, the hearing aid 2 is at least capable of monitoring usage points in time, usage events, and usage situations, especially switching on and off of the hearing aid 2, in the course of a day and in this aspect of determining an absolute and continuous time frame for the usage state. Up to the first calibration using a secondary device 4, an absolute time measurement then takes place, however, this is regularly shifted by an offset (thus a fixed value) with respect to the real time te. This is then corrected accordingly upon a later calibration and the time measurement up to this point is then converted. The original starting point S is then accordingly provided with the correct real time te. If 00:00 AM was used as the starting point S, for example, but the hearing aid 2 was actually switched on for the first time at 7:15 AM, a time difference of 7 hours 15 minutes exists up to the first calibration, which is then corrected (an offset in the date is similarly corrected if necessary). The previous data analysis is then corrected accordingly.

The two timers 10, 12 are optimized in the present case toward the respective operating state. In the design shown, for this purpose, the first timer 10 has a greater accuracy than the second timer 12 and the second timer 12 has—when activated—a lower energy consumption than the first timer 10—when activated. "Accuracy" is understood here as "chronological accuracy" or "frequency stability", i.e., how accurately the timer 10, 12 measures the time and how frequency stable the timer 10, 12 is. The higher the accuracy, the more uniformly the timer 10, 12 measures successive units of time and/or the lower the deviation ("drift") accumulated with time is from the real time te. The first timer 10 is therefore also referred to as a precision timer, in contrast the second timer 12 is referred to as a low-energy timer. The most accurate possible time measurement is now implemented using the first timer 10 and, on the other hand, the lowest possible energy consumption is implemented by the second timer 12 in the idle state. The absolute accuracy and absolute energy consumption of the two timers 10, 12 are primarily not important, energy consumption and accuracy of the two timers 10, 12 relative to one another are more important, and that the conflict of goals between accuracy and energy consumption is thus resolved differently in the different operating states. The first timer 10 is selected in the present case with respect to the accuracy and the second timer 12 is selected with respect to the energy consumption. Accordingly, the possible occurrence of a deviation of the hearing aid time th from the real time to is tolerated in the idle state and is insofar also unproblematic as it can be recognized accordingly upon a calibration using a secondary device 4 or upon a calibration of the second timer 12 using the first timer 10 and—if necessary—can be corrected again.

Figure 2:
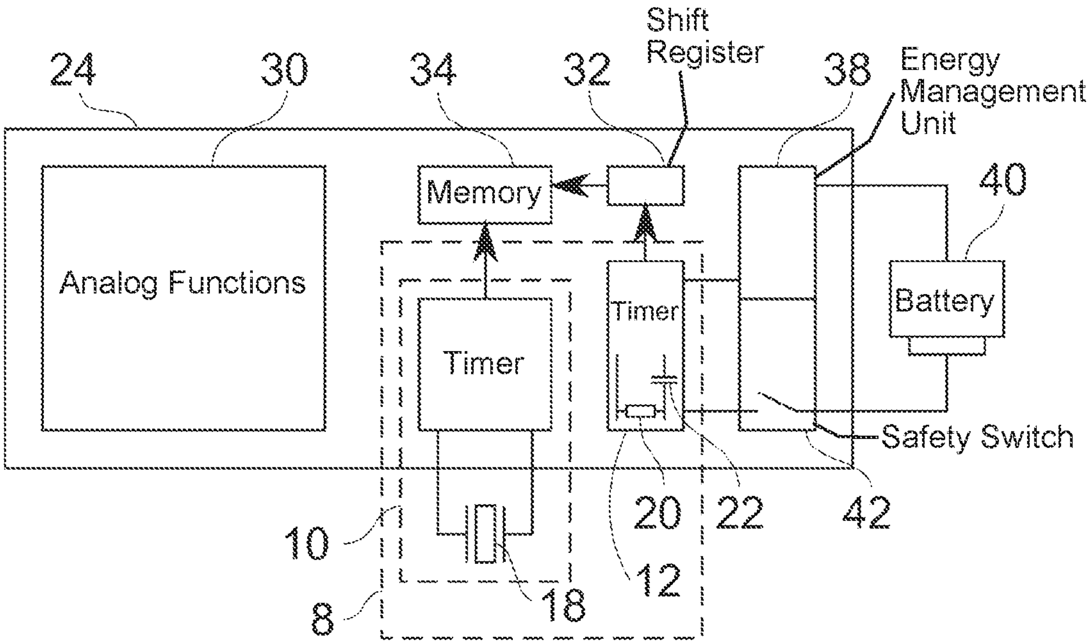
FIG. 2 is a block diagram showing a part of an interconnection of the hearing aid from FIG. 1.

In the exemplary embodiment of FIG. 2, the first timer 10 is a quartz oscillator, which uses an oscillating quartz 18 for the clock generation and thus for the time measurement and therefore has a high accuracy, i.e., is particularly frequency stable. The quartz oscillator is also used in one possible embodiment as a clock generator for operating the signal processing 6 and/or as a clock generator for other functions.

In the exemplary embodiment of FIG. 2, the second timer 12 is an RC oscillator, alternatively an LC oscillator is also possible. The second timer 12 is also a freewheeling oscillator, i.e., in contrast to a quartz oscillator is especially not particularly frequency stable, so that the second timer 12 has a clock frequency possibly varying over time. The RC oscillator has one or more resistors 20 and capacitors 22 for clock generation, which are suitably interconnected with one another to generate an oscillation and thus enable a time measurement. In FIG. 2, only one resistor 20 and one capacitor 22 are shown solely by way of example; other designs are also conceivable. An LC oscillator similarly has one or more inductors and capacitors for clock generation in order to generate an oscillation for the time measurement. In each case, the second timer 12 thus has at least one capacitor 22, which is repeatedly charged and discharged to generate the oscillations. The capacitor 22 also determines here with which energy the second timer 12 is charged at the beginning of the idle state.

The second timer 12 is integrated in the present case in an analog IC 24 (i.e., an analog integrated circuit) of the hearing aid 2. The analog IC 24 is formed separately from the signal processing unit 6 in the exemplary embodiment shown. The signal processing unit 6 is implemented here as part of a digital signal processor 26 (abbreviated: DSP). The analog IC 24 and also the signal processor 26 and therefore also the signal processing unit 6 are all parts of a control unit 28 of the hearing aid 2. The analog IC 24 is embodied, for example, as a microcontroller, ASIC, or the like; a design is also suitable in which the entire control unit 28 is designed as a microcontroller, ASIC, or the like, wherein then the analog IC 24 forms a section of the control unit 28, for example, as shown in FIG. 1. In addition to the second timer 12, still further analog functions 30, which are not of further relevance here, are also integrated in the analog IC 24 in FIG. 2.

In the exemplary embodiment of FIG. 2, the hearing aid 2 has a shift register 32, which is activated by the second timer 12 in such a way that the duration of the idle state is stored in the shift register 32. In the present case, for this purpose the shift register 32 is integrated in the analog IC 24 and connected to the second timer 12. A time measurement of the second timer 12 is stored in the shift register 32, for example, in that the shift register 32 is simply used as a counter which is progressively increased by the second timer 12 if the second timer 12 is activated.

In addition, the analog IC 24 in FIG. 2 has a main memory 34, which is connected to the above-mentioned shift register 32 in order to store a time measurement of the second timer 12 and then carry out a new time measurement using the shift register 32 without discarding the prior time measurement. In this way, the durations of various idle phases pr are measured and stored separately in the main memory 34, in the present case especially for continuous time measurement and for a data analysis. As soon as the idle state is deactivated and the usage state is activated, the shift register 32 is read out and the time measurement stored therein is stored in the main memory 34, to be combined, for example, added there with a time measurement of the first timer 10 from the preceding or the now following usage phase pn, and in this way to update the hearing aid time th. Accordingly, the first timer 10 in FIG. 2 is also connected to the main memory 34 in order to store a time measurement of the first timer 10 therein, for example, a duration of a usage phase pn.

As is recognizable in FIG. 2, the first timer 10 is at least partially integrated therein in the analog IC 24 in that the associated oscillating quartz 18 is not integrated in the analog IC 24, but rather formed as a separate component and then connected to the analog IC 24.

In the present case, the second timer 12 is formed untrimmed, i.e., uncalibrated. The second timer 12 is then calibrated using the first timer 10, i.e., a calibration is carried out. Since the first timer 10 is more accurate than the second timer 12, the latter may accordingly be calibrated using the former, so that a separate trimming during the production is omitted. For example, the hearing aid 2 has a zero crossing detector or flank detector (not explicitly shown) and a slide register as a counter for the calibration and the second timer 12 is calibrated in that its oscillations (also referred to as cycles) within a fixed time period and also the oscillations of the first timer 10 in the same time period are counted using the shift register and then compared to one another. In this way, a parameter is determined using which a time measurement of the second timer 12 is converted. The parameter is, for example, the ratio of number of cycles of the two timers per unit of time or the number of cycles of the second timer 12 per single cycle of the first timer 10 or the like. The parameter is stored, for example, in the main memory 34. The calibration and/or the determination of the parameter only takes place, for example, upon a first startup of the hearing aid 2 or alternatively or additionally repeatedly whenever the usage state is activated.

In the exemplary embodiment shown, the second timer 12 is moreover also not temperature stabilized. The hearing aid 2 then has a temperature sensor 36 which is already provided in any case, for example, for one or more other functions of the hearing aid 2. A temperature is measured using the temperature sensor 36, using which the second timer 12 is calibrated, i.e., a calibration is carried out (additionally or alternatively to the above-described calibration using the first timer 10). A linear relationship between temperature and deviation during the time measurement is assumed here, for example, or a calibration curve, function, or table is used, which is stored, for example, in the main memory 34. The temperature is either measured directly during the idle state or at the beginning and/or end of an idle phase pr, thus upon activation or deactivation of the idle state.

The hearing aid 2 shown here furthermore has an energy management unit 38 for controlling the energy supply of the diverse components of the hearing aid 2 and especially of the analog IC 24 and optionally further parts of the control unit 28. The energy supply is carried out using a battery 40 of the hearing aid 2. In the present case, the energy management unit 38 is integrated in the analog IC 24. Furthermore, the hearing aid 2 has a safety switch 42 to prevent a deep discharge of the battery 40 in that it is galvanically separated from the remaining hearing aid 2 below a minimum charge level. The safety switch 42 is also integrated in the analog IC 24 in FIG. 2. The safety switch 42 is formed open during the production of the hearing aid 2 and is opened during the delivery to the user and is only closed upon the first startup of the hearing aid 2. In this way, a deep discharge of the battery 40 is avoided before the startup. In the present case, the safety switch 42 is moreover a reversible switch, so that a deep discharge of the battery 40 is also still avoided after the first startup, for example, if the duration of a single idle phase pr is sufficiently long that the charge state of the battery 40 sinks below the minimum charge level. The safety switch 42 is then opened again by the energy management unit 38 when the charge level of the battery 40 sinks below the minimum charge level. Otherwise, the safety switch 42 also remains closed when the idle state is activated, however, so that the second timer 12 is supplied with energy.

The energy management unit 38 also controls a supply of the second timer 12 with energy from the battery 40. For example, the second timer 12 is charged once with energy from a battery 40 upon activation and then subsequently is not supplied further with energy from the battery 40 as long as the idle state is activated. Alternatively, the second timer 12 is repeatedly charged from the battery 40 of the hearing aid 2 in the idle state. Especially in the case of an RC or LC oscillator, one or more capacitors 22 are charged for the time measurement and then do not require further energy for a specific time. However, the charged energy is consumed with time so that renewed charging can be necessary if this lasts longer than the idle state is activated, however, a single charge at the beginning of an idle phase pr is sufficient. If the second timer 12 is repeatedly charged during the idle state, this takes place, for example, whenever the second timer 12 falls below a minimum charge level.

A design is also possible in which the duration of the idle state is only measured up to a maximum duration and the second timer 12 is only charged in the idle state when the maximum duration is not yet reached. In this way, a deep discharge of the battery 40 is prevented in that the time measurement using the second timer 12 is only carried out until reaching the maximum duration, for example, 7 days, and then the second timer 12 is also deactivated, so that energy is no longer consumed. Alternatively or additionally, a deep discharge of the battery 40 is avoided in that the second timer 12 is only supplied with energy from the battery 40 in the idle state when a charge level of the battery 40 at least corresponds to a minimum charge level. The charge level is determined, for example, on the basis of the voltage of the battery 40 or this is used directly as a measure for the charge level.

The following is a summary list of reference numerals and the corresponding structure used in the above description of the invention:

2 hearing aid
4 secondary device
6 signal processing unit
8 time measuring unit
10 first timer
12 second timer
14 input transducer
16 output transducer
18 oscillating quartz
20 resistor
22 capacitor
24 analog IC
26 signal processor
28 control unit
30 further analog functions

32 shift register
34 main memory
36 temperature sensor
38 energy management unit
40 battery
42 safety switch
S starting point
to real time
th hearing aid time
pn usage phase
pr idle phase

The invention claimed is:

1. A method for operating a hearing aid having a time measuring unit with a first timer and a second timer, which comprises the steps of:

switching the hearing aid between a usage state, in which a signal processing unit of the hearing aid is activated, and an idle state, in which the signal processing unit is deactivated;

activating the first timer in the usage state and deactivating the first timer in the idle state for a time measurement during the usage state;

activating the second timer in the idle state for a time measurement during the idle state; and determining a continuous time measurement by the time measuring unit updating a hearing aid time in the usage state using the first timer and in the idle state using the second timer.

2. The method according to claim 1, which further comprises calibrating the time measuring unit by means of real time, which is provided by a secondary device, which is connected to the hearing aid for data exchange.

3. The method according to claim 1, wherein:

the first timer has a greater accuracy than the second timer; and the second timer has a lower energy consumption than the first timer.

4. The method according to claim 1, wherein the first timer is a quartz oscillator.

5. The method according to claim 1, wherein the second timer is an RC oscillator or LC oscillator.

6. The method according to claim 1, wherein the hearing aid has a shift register, which is activated by the second timer such that a duration of the idle state is stored in the shift register.

7. The method according to claim 1, wherein the second timer is formed untrimmed and is calibrated using the first timer.

8. The method according to claim 1, wherein:

the second timer is not temperature stabilized; and the hearing aid has a temperature sensor for measuring a temperature and for calibrating the second timer.

9. The method according to claim 1, wherein the second timer is charged once using energy from a battery of the hearing aid upon activation and is then subsequently not further supplied with energy from the battery as long as the idle state is activated.

10. The method according to claim 1, which further comprises repeatedly charging the second timer in the idle state from a battery of the hearing aid.

11. The method according to claim 10, wherein:

a duration of the idle state is only measured up to a maximum duration; and the second timer is only charged in the idle state when the maximum duration is not yet reached.

12. The method according to claim 10, wherein the second timer is only supplied with energy from the battery in the idle state when a charge level of the battery at least corresponds to a minimum charge level.

13. A hearing aid, comprising:

a controller configured to carry out the method according to claim 1.

* * * * *